(12) United States Patent
Min

(10) Patent No.: US 10,126,931 B2
(45) Date of Patent: Nov. 13, 2018

(54) MOBILE TERMINAL AND CONTROLLING METHOD THEREOF

(71) Applicant: LG Electronics Inc., Seoul (KR)

(72) Inventor: Dongog Min, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/855,070

(22) Filed: Sep. 15, 2015

(65) Prior Publication Data

US 2016/0092058 A1 Mar. 31, 2016

(30) Foreign Application Priority Data

Sep. 26, 2014 (KR) .................. 10-2014-0129205

(51) Int. Cl.
*G06F 3/0485* (2013.01)
*G06F 3/0486* (2013.01)
*G06F 3/0488* (2013.01)
*G06F 3/041* (2006.01)

(52) U.S. Cl.
CPC .......... *G06F 3/0485* (2013.01); *G06F 3/0412* (2013.01); *G06F 3/0486* (2013.01); *G06F 3/0488* (2013.01); *G06F 3/04883* (2013.01); *G06F 2203/04808* (2013.01)

(58) Field of Classification Search
CPC .... G06F 3/0485; G06F 3/0412; G06F 3/0486; G06F 3/0488; G06F 3/04883; G06F 2203/04808
USPC ........................................................ 345/173
See application file for complete search history.

(56) References Cited

U.S. PATENT DOCUMENTS

| 6,204,846 B1* | 3/2001 | Little ................. G06F 3/04855 715/784 |
| 7,480,870 B2* | 1/2009 | Anzures ................ G06F 3/017 345/173 |
| 7,676,759 B2* | 3/2010 | Carter .................. G06F 3/0485 715/721 |

(Continued)

FOREIGN PATENT DOCUMENTS

| EP | 2 487 613 A1 | 8/2012 |
| EP | 2 775 386 A2 | 9/2014 |

(Continued)

OTHER PUBLICATIONS

Amit Agarwal, "YouTube Player with Thurnbnails," YouTubeDe, https://www.youtube.com/watch?v=RW2qPt1_Cf8, Jan. 8, 2012, 1 page, XP-54976348A.

(Continued)

*Primary Examiner* — Benyam Ketema
(74) *Attorney, Agent, or Firm* — Birch, Stewart, Kolasch & Birch, LLP

(57) ABSTRACT

A mobile terminal including a wireless communication unit configured to provide wireless communication; a touchscreen; and a controller configured to display a content screen on the touchscreen, receive a touch input to a first point on the touchscreen, held over a prescribed time, and then released from a second point, scroll the content screen by a prescribed scroll distance corresponding to a distance between the first point and the second point, and display a preview image for content at a scrolled point while the touch input is held.

10 Claims, 17 Drawing Sheets

(56) References Cited

U.S. PATENT DOCUMENTS

| | | | | |
|---|---|---|---|---|
| 8,836,648 | B2* | 9/2014 | Wilairat | G06F 3/04883 178/18.01 |
| 9,569,085 | B2* | 2/2017 | Park | G06F 3/04855 |
| 2002/0109728 | A1* | 8/2002 | Tiongson | G06F 3/04855 715/786 |
| 2002/0186252 | A1* | 12/2002 | Himmel | G06F 3/0485 715/784 |
| 2005/0210403 | A1* | 9/2005 | Satanek | G06F 3/04855 715/786 |
| 2008/0178116 | A1 | 7/2008 | Kim | |
| 2010/0095239 | A1 | 4/2010 | McCommons et al. | |
| 2010/0298034 | A1* | 11/2010 | Shin | G06F 3/04883 455/566 |
| 2011/0055753 | A1* | 3/2011 | Horodezky | G06F 3/04883 715/810 |
| 2011/0078568 | A1* | 3/2011 | Park | G06F 3/04883 715/702 |
| 2011/0265002 | A1 | 10/2011 | Hong et al. | |
| 2012/0084692 | A1* | 4/2012 | Bae | G06F 3/04817 715/769 |
| 2013/0067397 | A1* | 3/2013 | Kirschner | G06F 3/04883 715/799 |
| 2013/0268883 | A1* | 10/2013 | Kim | G06F 3/0485 715/784 |
| 2013/0335337 | A1* | 12/2013 | Chua | G06F 3/0488 345/173 |
| 2014/0059474 | A1* | 2/2014 | Cho | G06F 3/0488 715/776 |
| 2014/0059482 | A1* | 2/2014 | Won | G06F 3/04855 715/787 |
| 2014/0075388 | A1* | 3/2014 | Kuscher | G06F 3/0482 715/834 |
| 2014/0215386 | A1* | 7/2014 | Song | G06F 3/04855 715/787 |

FOREIGN PATENT DOCUMENTS

| | | |
|---|---|---|
| WO | WO 01/69369 A1 | 9/2001 |
| WO | WO 2010/024969 A1 | 3/2010 |
| WO | WO 2015/184236 A1 | 12/2015 |

OTHER PUBLICATIONS

Daylife, "Microsoft Surface 2 Review Best Tablet Ever!," YouTubeDe, https://www.youtube.com/watch?v=9vLkjKxVObA, Oct. 26, 2013, 2 pages XP-54976347A.

Microsoft, "Surface 2 User Guide With Windows RT 8.1 Software," Version 2.0, Mar. 2014, pp. 1-96 (Total 102 pages), XP-55246480A.

* cited by examiner

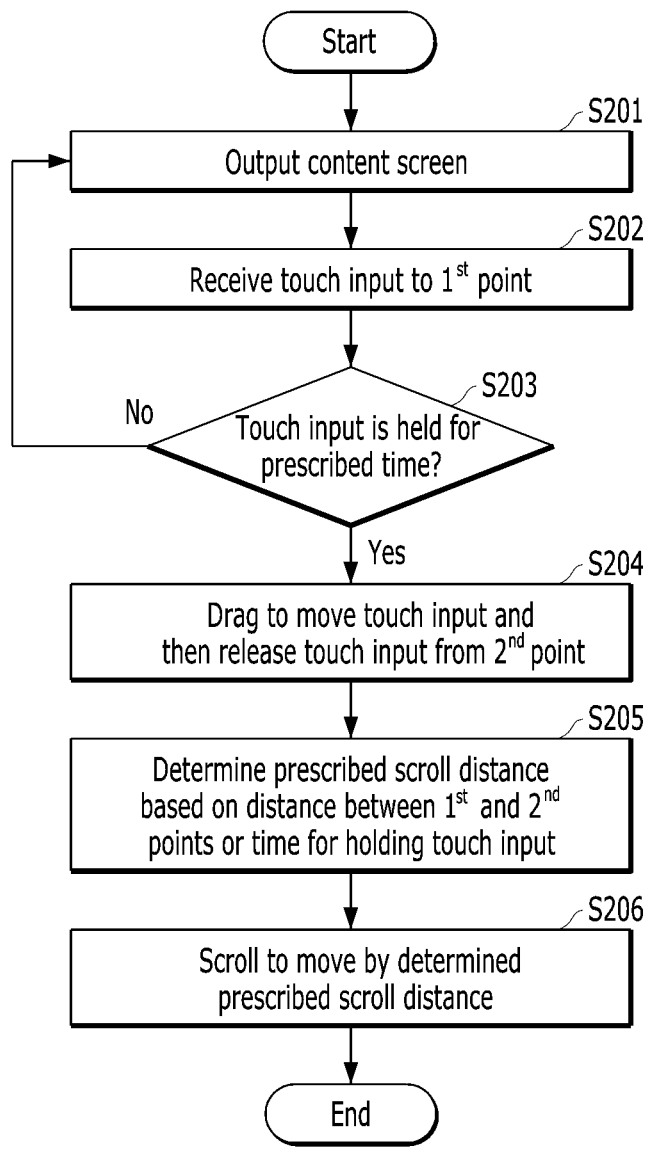

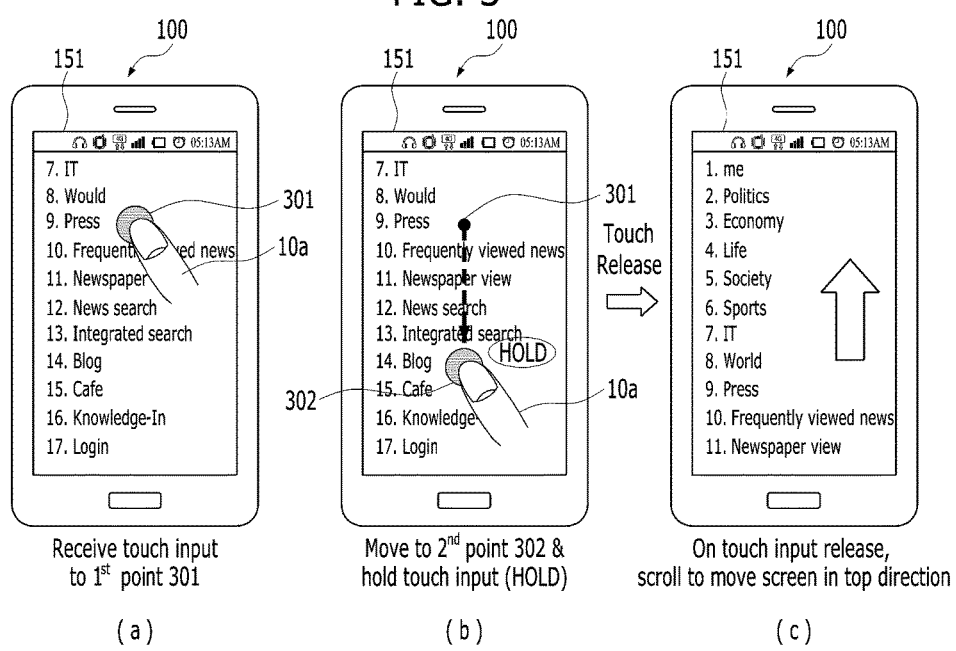

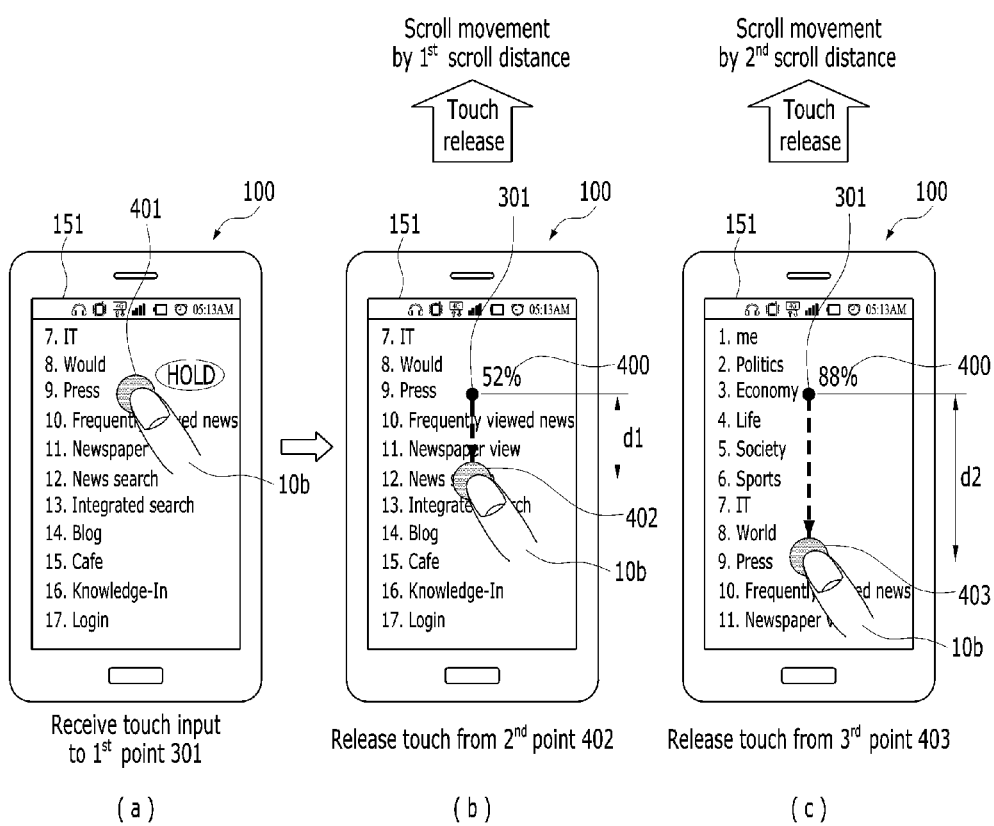

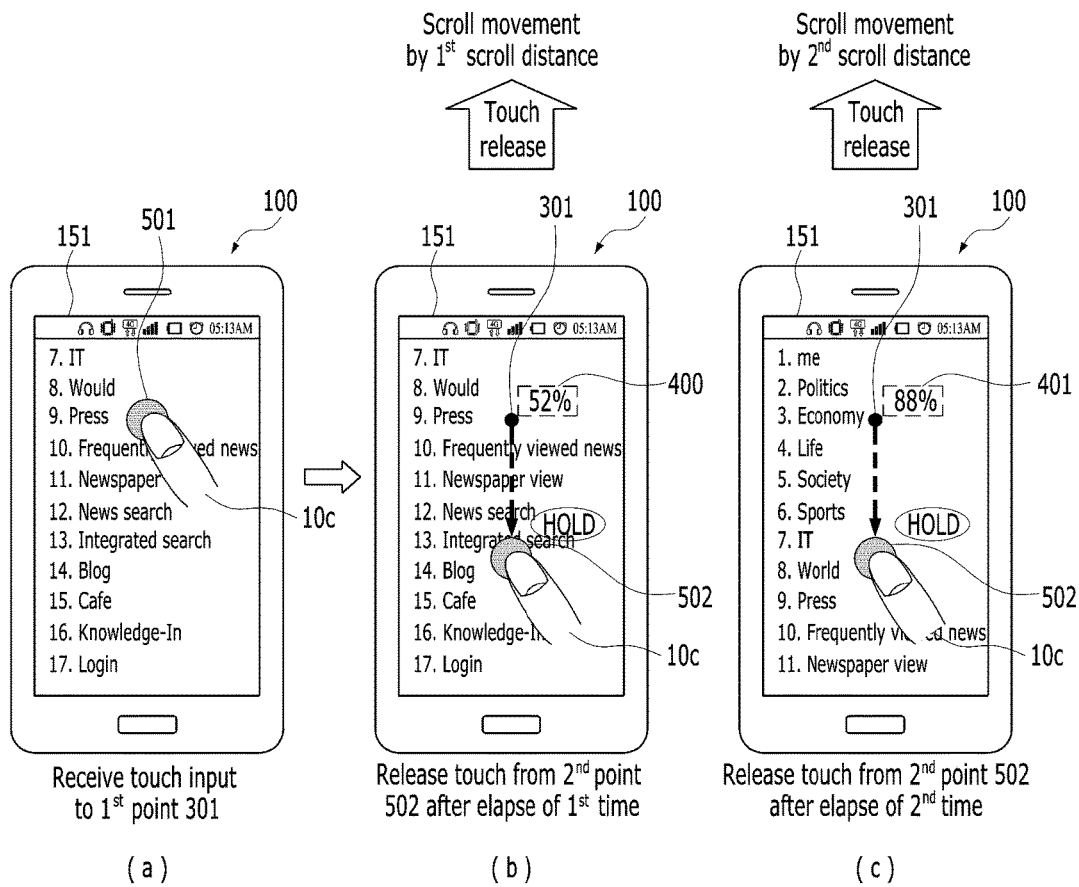

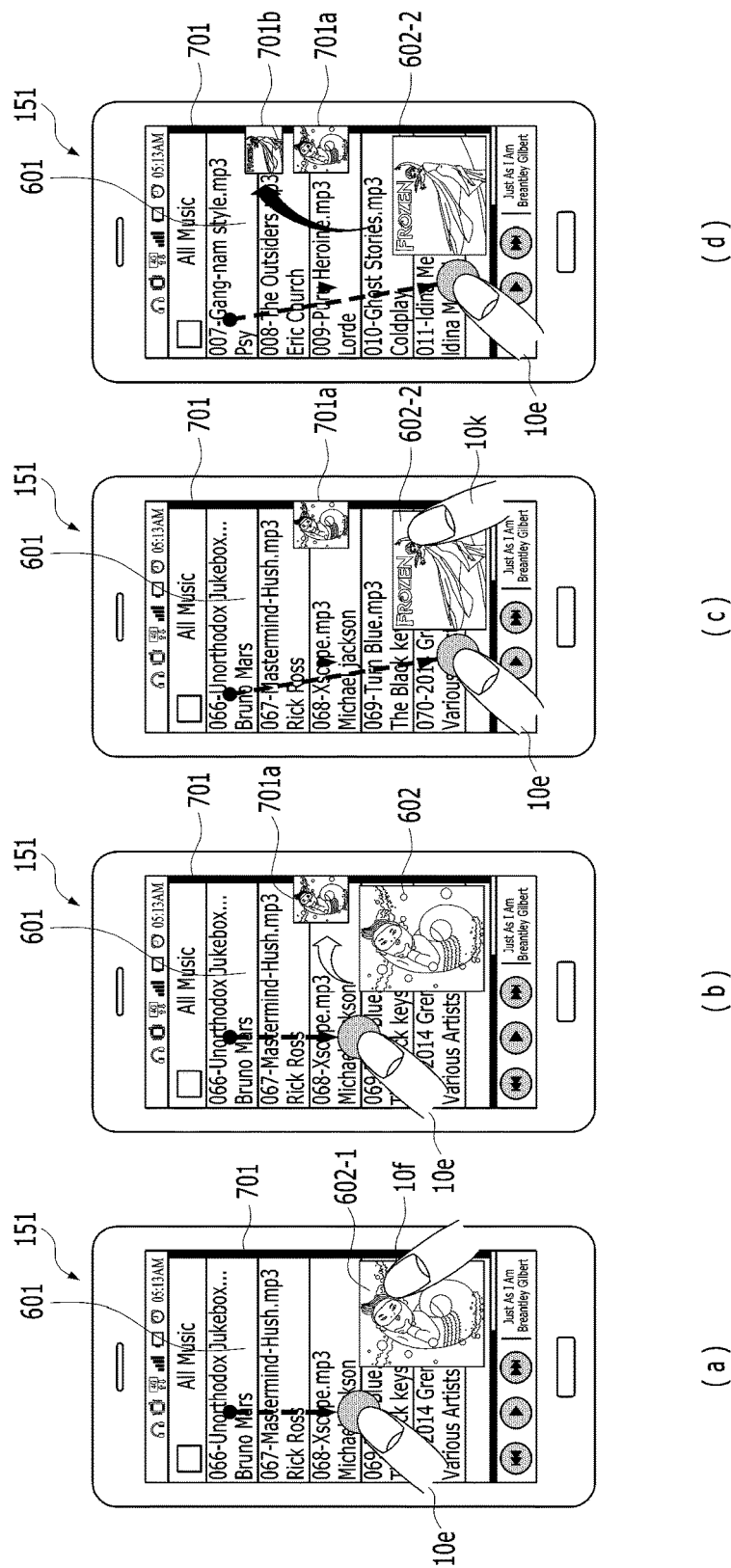

(a) (b) (c)

(a) (b) (c)

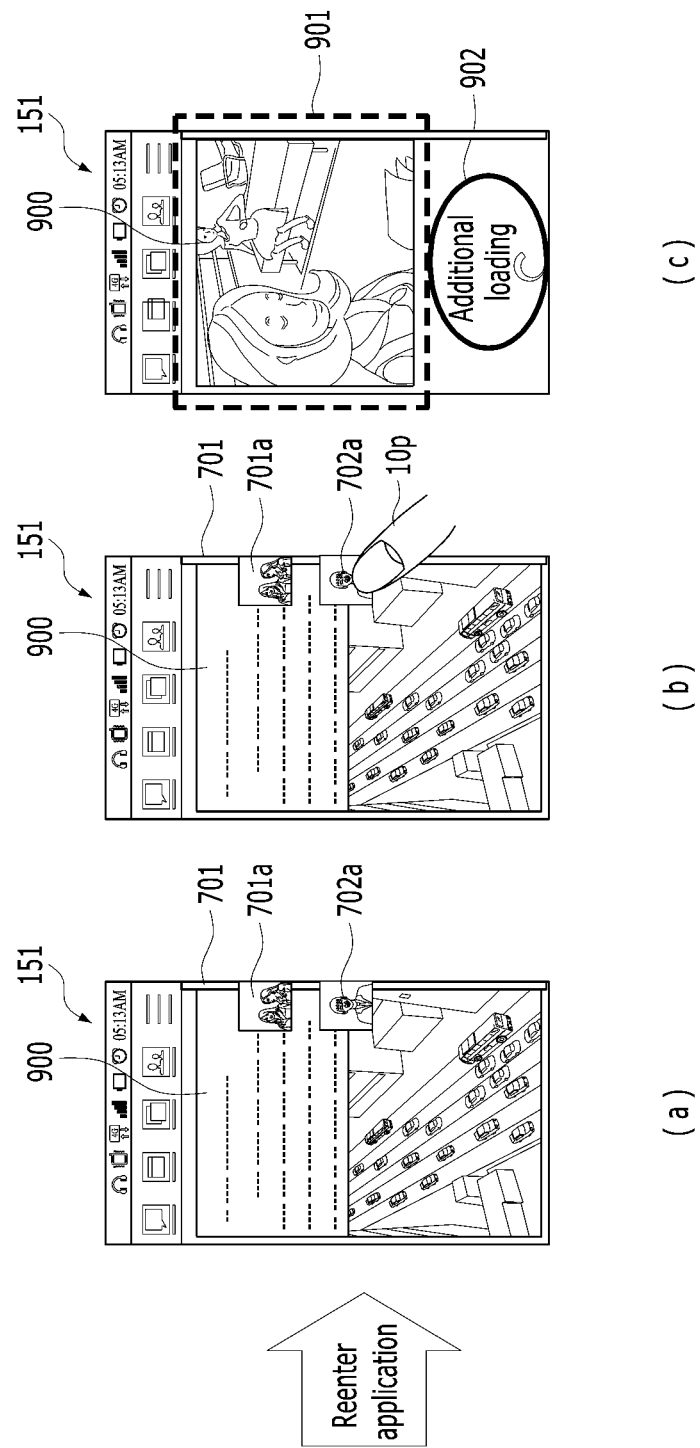

MOBILE TERMINAL AND CONTROLLING METHOD THEREOF

Pursuant to 35 U.S.C. § 119(a), this application claims the benefit of earlier filing date and right of priority to Korean Application No. 10-2014-0129205, filed on Sep. 26, 2014, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating the use of a terminal in further consideration of user's convenience.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mounted terminals.

When a size of a screen for displaying content exceeds a size of a display, a scroll mechanism is provided in general. A control command for a scroll movement mainly uses a wheel button of a mouse in case of a PC (personal computer) or a touch drag input through a touch screen in case of a mobile terminal using the touchscreen. A scroll moving distance available by the touch drag method may not exceed one-directional length of the touchscreen.

However, if a size of a screen for displaying content increases, it is inconvenient for a user to repeatedly input the same control command when using the above-mentioned method. Thus, the demands for a controlling method for facilitating a control of a considerable amount of a scroll moving distance are increasingly rising.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a scroll moving distance can be easily controlled.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a touchscreen and a controller controlling the touchscreen to output a content screen, the controller, if a touch input to a first point on the touchscreen is received, held over a prescribed time, and then released from a second point, scrolling to move the content screen by a prescribed scroll distance, the controller outputting a preview image for the scroll-moved point while the touch input is held, wherein the prescribed scroll distance is determined based on a distance between the first point and the second point.

In another aspect of the present invention, as embodied and broadly described herein, a method of controlling a mobile terminal according to another embodiment of the present invention may include the steps of outputting a content screen through a touchscreen, if a touch input to a first point on the touchscreen is received, held over a prescribed time, and then released from a second point, scrolling to move the content screen by a prescribed scroll distance, and outputting a preview image for the scroll-moved point while the touch input is held, wherein the prescribed scroll distance is determined based on a distance between the first point and the second point.

Effects obtainable from the present invention may be non-limited by the above mentioned effect. And, other unmentioned effects can be clearly understood from the following description by those having ordinary skill in the technical field to which the present invention pertains.

Both the foregoing general description and the following detailed description of the preferred embodiments of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 2 is a flowchart of a controlling method for performing a considerable amount of scroll using a prescribed touch gesture according to one embodiment of the present invention;

FIG. 3 is a diagram of state configuration for a control method of performing a considerable amount of scroll using a prescribed touch gesture according to one embodiment of the present invention;

FIG. 4 is a diagram illustrating a first example of determining a scroll distance according to one embodiment of the present invention;

FIG. 5 is a diagram illustrating a second example of determining a scroll distance according to one embodiment of the present invention;

FIG. 7 is a diagram illustrating a control method of designating an index item of a scroll movement according to one embodiment of the present invention;

FIG. 13 is a diagram illustrating a control method of facilitating a scroll movement to a prescribed item using a pre-saved index information despite relaunching an SNS application after stopping the SNS application according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
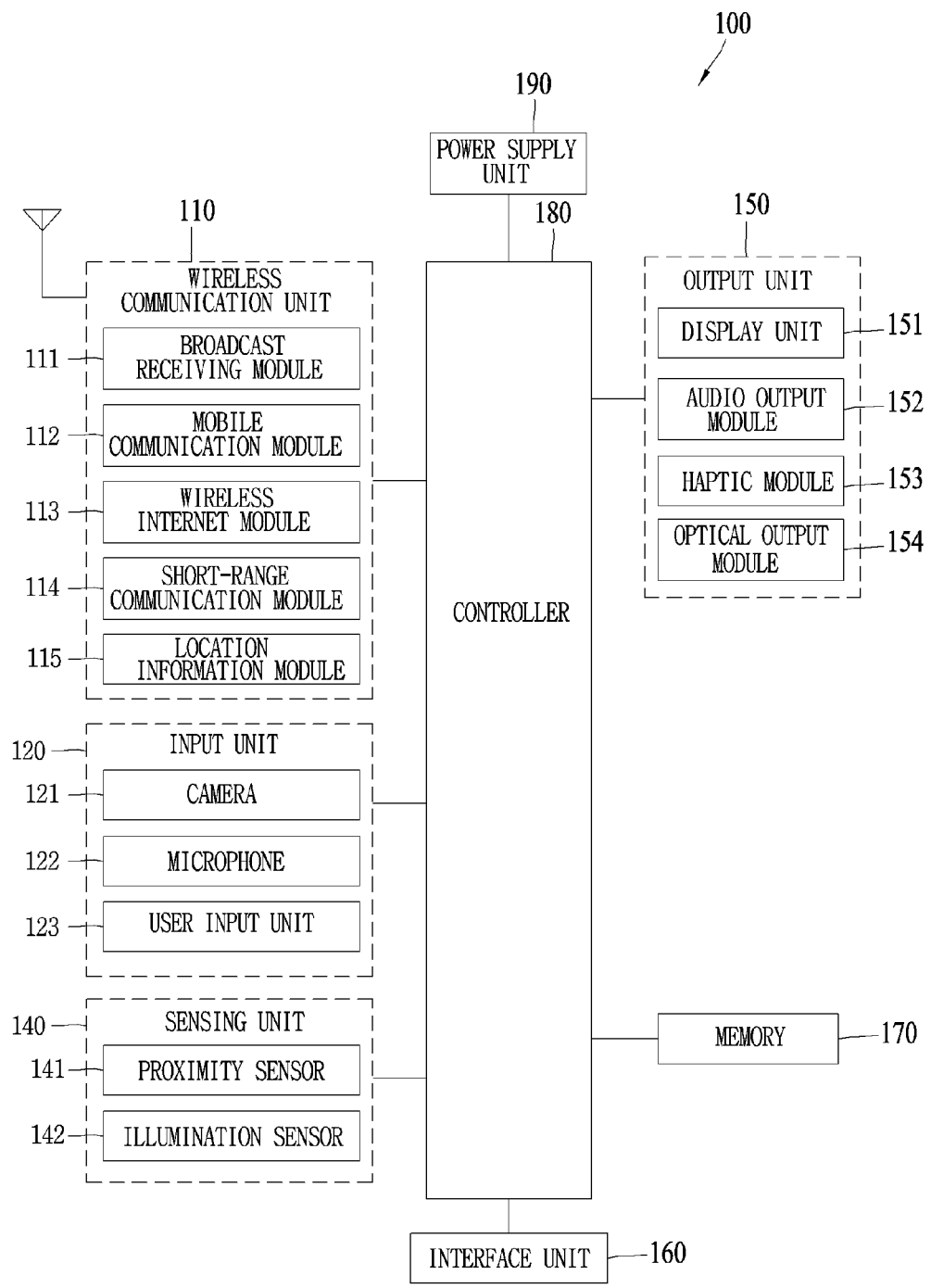
FIG. 1A is a block diagram of a mobile terminal in accordance with the present disclosure.
Figure 1B:
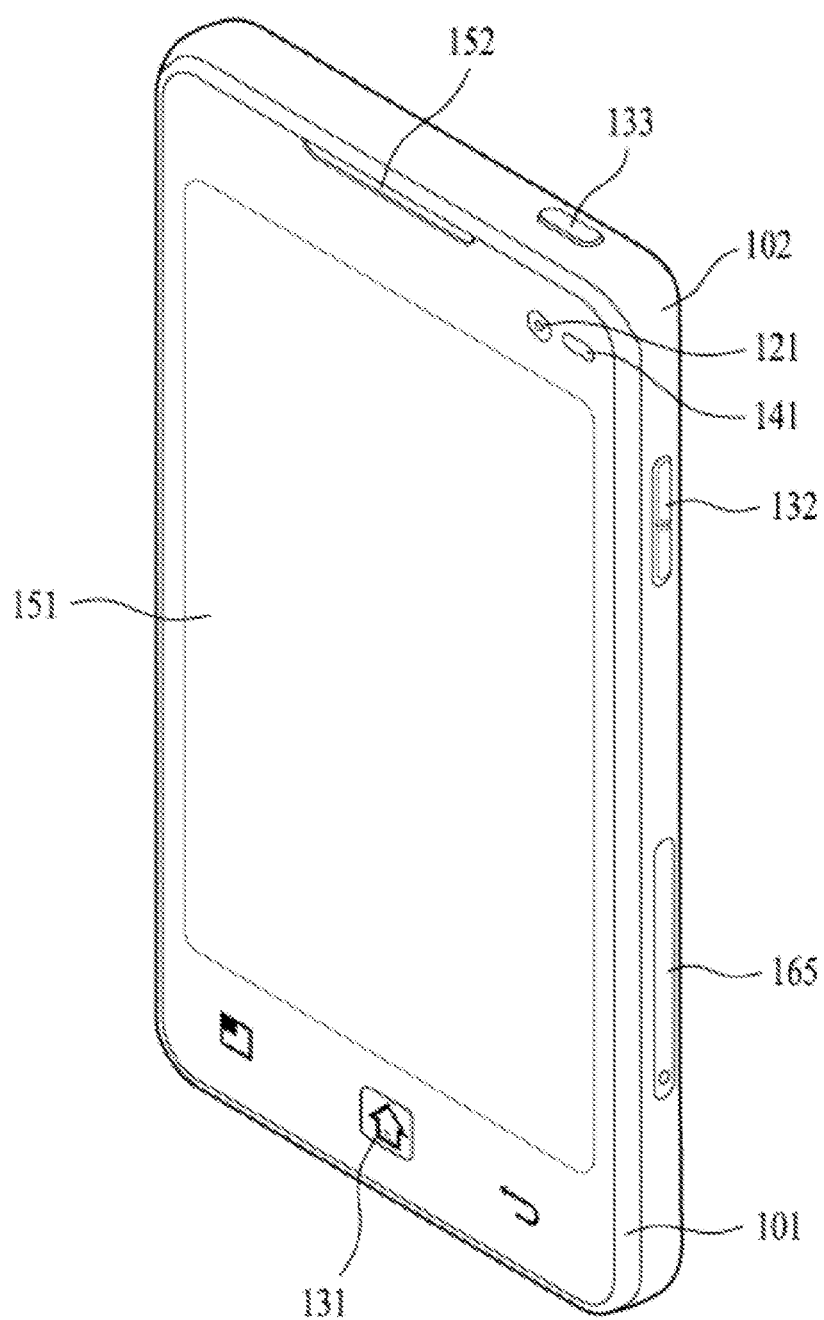
FIGS. 1B and 1C are conceptual views of one example of the mobile terminal, viewed from different directions.
Figure 1C:
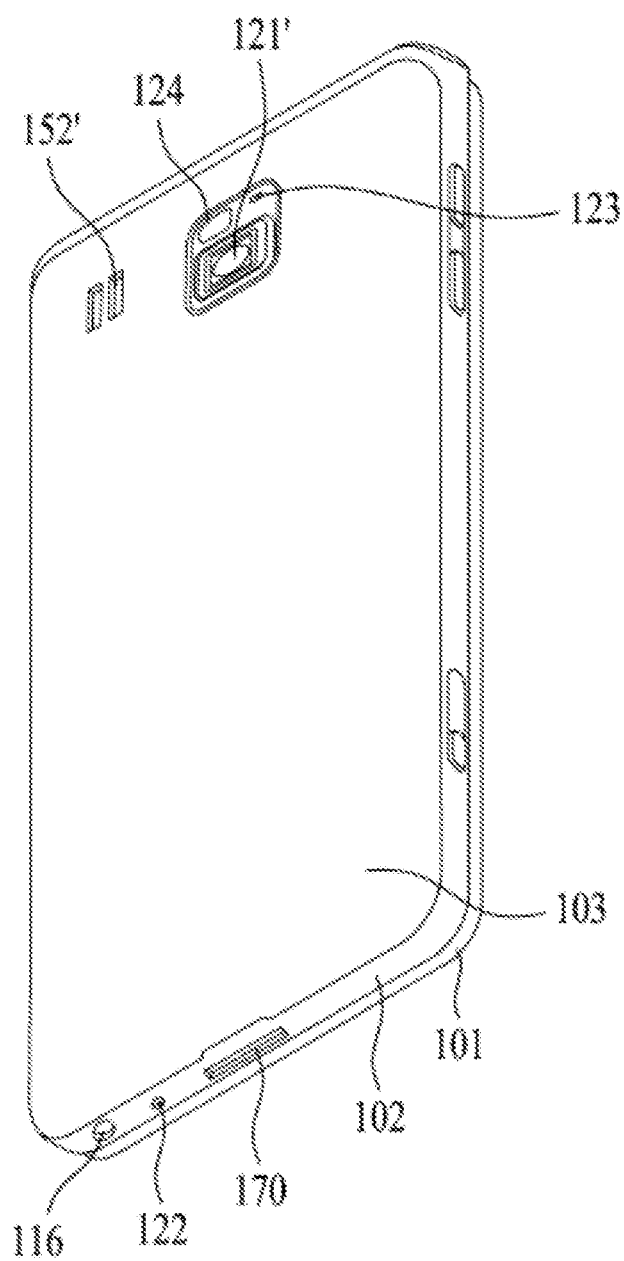

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like input or output through the above-mentioned components and/or runs application programs saved in the memory 170, thereby processing or providing a user with appropriate information and/or functions.

The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages. The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source.

Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first audio output unit 152a, the second audio output unit 152b, the proximity sensor 141, the illumination sensor 142, the light output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

For the mobile terminal 100 that uses a touchscreen, limitation is put on a size of the touchscreen for the purpose of portability of the mobile terminal 100. If a scroll control command is input using such a touchscreen, when it is necessary to perform a considerable amount of scroll, it will be inevitable to input control commands repeatedly. According to one embodiment of the present invention, it is intended to propose a control method of facilitating scroll amount adjustment. Such an embodiment shall be described in detail with reference to the accompanying drawings as follows.

FIG. 2 is a flowchart of a controlling method for performing a considerable amount of scroll using a prescribed touch gesture according to one embodiment of the present invention. FIG. 3 is a diagram of state configuration for a control method of performing a considerable amount of scroll using a prescribed touch gesture according to one embodiment of the present invention. The following description is made with reference to FIG. 2 and FIG. 3 together.

First of all, as a control command for applying a scroll according to an embodiment mentioned in the following description, a touch gesture is applied as if drawing a slingshot. In particular, a scroll action to be performed on a screen is controlled using a touch gesture applied by applying a touch to a first point on the touchscreen 151, dragging the touch to a second point, and then releasing the touch. Such an embodiment is described step by step in detail as follows.

Referring to FIG. 2 and FIG. 3, in a step S201, the controller 180 outputs a content screen (FIG. 3 (a)). In this instance, if a scroll action can be performed on a screen without being limited by any examples, one embodiment of the present invention is applicable to the content screen. For example, the content screen may include one of a web browser running screen, a content list screen, a music play list screen and the like.

In a step S202, the controller 180 receives a touch input 10a to a first point 301 on the touchscreen 151 (FIG. 3 (a)).

In a step S203, the controller 180 determines whether the touch input 10a is held over a prescribed time without being released. As a result of the determination, if the touch input 10a fails to be held over the prescribed time (No in S203), the routine goes back to the step S201. As a result of the determination, if the touch input 10a is held over the prescribed time (Yes in S203), the routine goes to a step S204.

The reason for determining whether the touch input is held is to distinguish the above-mentioned touch input from other touch gestures. If it is preset to perform a different action using a touch-drag input, the former touch-drag input should be distinguished from a touch-drag input of one embodiment of the present invention. Therefore, according to one embodiment of the present invention, the controller 180 determines whether a touch is held over a prescribed time in order to be distinguished from an action of touch-drag used in general.

Meanwhile, the gesture of dragging the touch input 10a to the second point 302 from the first point 301 and the gesture of holding the touch can be applied to one embodiment of the present invention irrespective of the order for inputting the two gestures. In particular, the case of holding the touch input 10a over the prescribed time and then dragging the touch input 10a to the second point or the case of dragging the touch input to the second point and then holding the touch input, or the case of dragging the touch input to an in-between point between the first point and the second point, holding the touch input over a prescribed time, and then dragging the touch input to the second point is applicable to one embodiment of the present invention. According to the embodiment mentioned in the following description, the touch input 10a is applied in random order of dragging and holding, by which the order of applying the touch input 10a is non-limited.

In a step S204, referring to FIG. 3 (b), the controller 180 can detect that the touch input 10a is released from the second point 302 by the drag movement. In a step S205, the controller 180 determines a prescribed scroll distance based on a distance between the first point and the second point or a time for holding the touch input 10a. A control method of determining a scroll distance shall be described in detail later with reference to the accompanying drawings later.

In a step S206, referring to FIG. 3 (c), the controller 180 controls the content screen to be scrolled to move by the prescribed scroll distance determined in the step S205. Further, a direction of the scroll movement may include a direction from a second location toward a first location. According to the example shown in FIG. 3, since the direction from the second position toward the first location is a top direction, if the touch input is released, the controller 180 can control the content screen to be scrolled to move in the top direction. In the step S205, the controller 180 has determined the scroll distance. A method of determining the scroll distance is described in detail with reference to FIG. 4 and FIG. 5 as follows.

FIG. 4 is a diagram illustrating a first example of determining a scroll distance according to one embodiment of the present invention. According to one embodiment of the present invention related to FIG. 4, the controller 180 determines a scroll distance based on a touch drag distance (e.g., a distance between a first location and a second location). According to one embodiment of the present invention, a touch drag distance means a distance between a first point having a touch input applied thereto and a second point that is a currently touched point.

Referring to FIG. 4 (a), the mobile terminal 100 receives a user's touch input 10b through a first point 401 of the touchscreen 151. And, assume that the received touch input 10b is held over a prescribed time. According to the embodiment related to FIG. 4, the controller 180 can determine a scroll distance based on a touched & dragged distance.

Referring to FIG. 4 (b), after the touch input 10b has been dragged to a second point 402, if the touch input 10b is released, the controller 180 can scroll to move the screen by a first scroll distance. In this instance, the first scroll distance is determined based on a distance d1 between the first point 401 and the second point 402. For instance, the controller 180 can control the scroll distance to be determined in proportion to the distance d1. In particular, the controller 180 can determine the scroll distance by multiplying the distance d1 by a prescribed numerical value.

If the touch input 10b is dragged to a third point 403 and then released, as shown in FIG. 4 (c), the controller 180 can scroll to move the screen by a second scroll distance. In this instance, the second scroll distance can be determined based on a distance d2 between the first point 401 and the third point 403.

According to one embodiment of the present invention, a distance indicator 400 for guiding a scroll distance can be further output. Since a scroll controlling method according to one embodiment of the present invention is the control method for facilitating a considerable amount of scroll, an amount of movement by scroll may be considerably large. Hence, according to one embodiment of the present invention, in order to indicate a prescribed amount of scroll, the controller 180 outputs the distance indicator 400.

According to one embodiment of the present invention, the distance indicator 400 can be represented as a percentage of a scroll distance over a total scrollable amount (i.e., a total length of a content screen). Referring to FIG. 4 (b), the distance indicator 400 indicates 52%, which may mean that the first scroll distance determined by the distance d1 amounts to 52% of the total scrollable amount. Likewise, the distance indicator 400 shown in FIG. 4 (c) means that the second scroll distance amounts to 88% of the total scrollable amount.

FIG. 5 is a diagram illustrating a second example of determining a scroll distance according to one embodiment of the present invention. According to one embodiment of the present invention related to FIG. 5, the controller 180 determines a scroll distance based on a touch held time.

Referring to FIG. 5 (a), the mobile terminal 100 receives a user's touch input 10c through a first point 501 of the touchscreen 151. According to the embodiment related to FIG. 5, the controller 180 can determine a scroll distance based on a touch held time. Referring to FIG. 5 (b), after the touch input 10c has been dragged to a second point 502, if the touch input 10c is released after the elapse of a first time, the controller 180 can scroll to move the screen by a first scroll distance. In this instance, the first scroll distance is determined based on the first time.

For instance, the controller 180 can control the scroll distance to be determined in proportion to the first time. In particular, the controller 180 can determine the scroll distance by multiplying the first time by a prescribed numerical value. If the touch input 10c is dragged to a second point 502 and then released after an elapse of a second time, as shown in FIG. 5 (c), the controller 180 can scroll to move the screen by a second scroll distance. In this instance, the second scroll distance can be determined based on the second time.

According to one embodiment of the present invention related to FIG. 5, a distance indicator 400 for guiding a scroll distance can be further output as well. Since the distance indicator 400 is as good as described with reference to FIG. 4, its details are omitted form the following description. According to one embodiment of the present invention, since an amount of movement by scroll is considerably large, it is difficult to estimate an amount of a scroll applied by a user. Therefore, according to one embodiment of the present invention, the controller 180 displays a preview image for an item of a point moved by a scroll. Such an embodiment is described in detail with reference to FIG. 6A and FIG. 6B as follows.

Figure 6A:
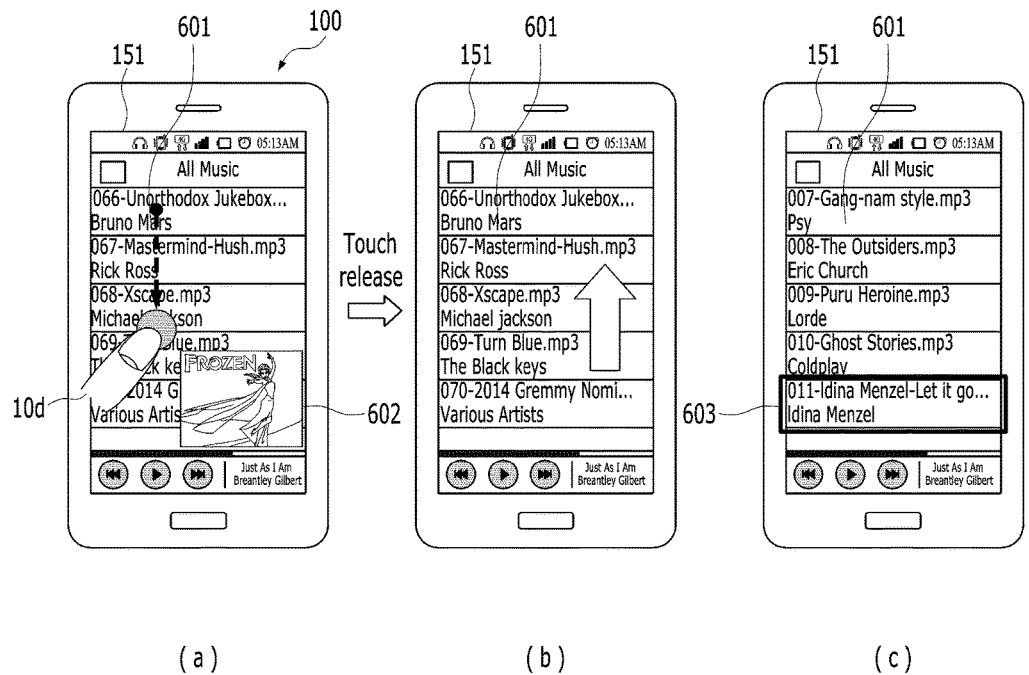
FIG. 6A and FIG. 6B are diagrams illustrating state configurations for a control method of outputting a preview image of a destination item on a scroll movement according to one embodiment of the present invention.
Figure 6B:
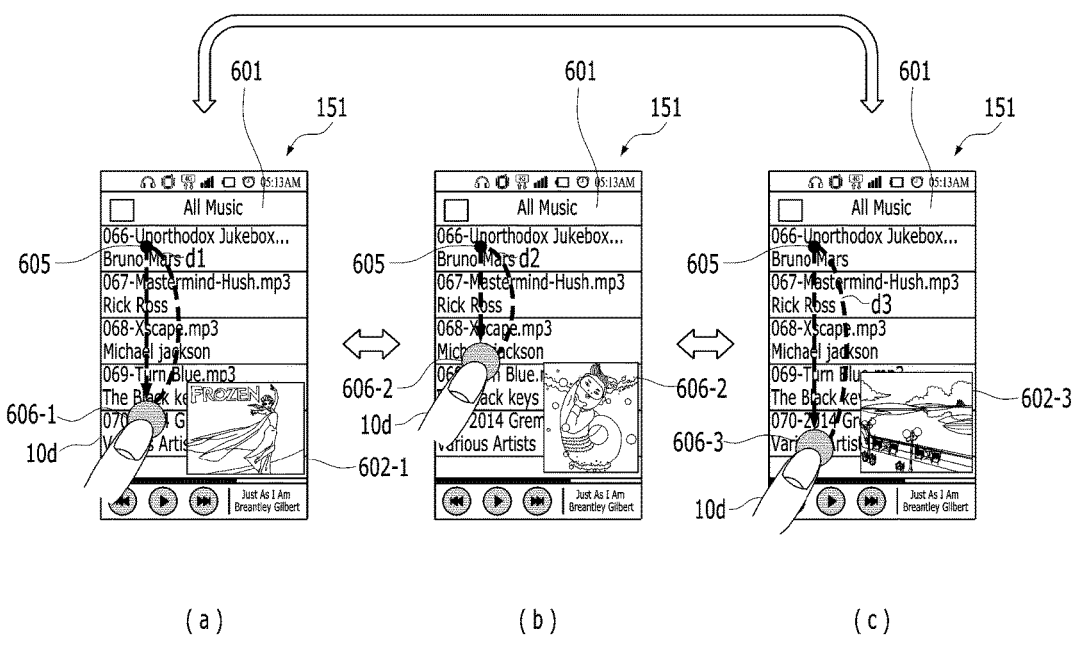

FIG. 6A and FIG. 6B are diagrams illustrating state configurations for a control method of outputting a preview image of a destination item on a scroll movement according to one embodiment of the present invention. For clarity of the drawings, an exterior of the mobile terminal 100 is omitted but a state configuration of the touchscreen 151 is illustrated only.

Referring to FIG. 6A (a), the mobile terminal 100 outputs a music content play list 601 through the touchscreen 151. If the scroll controlling method is applied to the music content play list 601, the controller 180 can scroll to move the music content play list 601. If the number of content items included in the music content play list 601 is big, a user can have difficulty in estimating a scrolled location on the list. Therefore, according to one embodiment of the present invention, the controller 180 outputs a preview image of a destination item reached by the scroll movement while a touch is held.

Referring now to FIG. 6A (a) again, a user applies a touch input 10*d* to a first point on the music content play list 601 output through the touchscreen 151 and then moves a touch point to a second point. While the touch input 10*d* is held, the controller 180 determines a destination item (cf. 603 shown in FIG. 6A (c)) for a destination of the corresponding movement in response to a release of the touch input and can then output a preview image 602 of the corresponding destination item 603 to a prescribed region (cf. FIG. 6A (a)).

Referring to FIG. 6A (b), if the touch input 10*d* is released, the controller 180 can scroll to move the music content play list 601. Subsequently, referring to FIG. 6A (c), the controller 180 can move the screen to the prescribed destination item 603 by scroll. In this instance, the preview image 602 output in FIG. 6A (a) may include an album image of the prescribed destination item 603. In case of a post list of an SNS (social network service) instead of the music content play list 601, a photo included in the corresponding post may be displayed as the preview image 602 (cf. the part related to FIG. 9).

Moreover, while the touch input 10*d* is held in FIG. 6A (a), if the touch point is moved, the destination item can be changed. If so, the controller 180 determines the changed destination item again and can then change the preview image 602. Such an embodiment is described in detail with reference to FIG. 6B as follows.

Referring to FIGS. 6B (a) to 6B (c), while a touch input is held, a touch drag distance is changed to one of d1 to d3. According to the example shown in FIG. 6B (a), the distance d1 may mean a distance between a first point 605 having a touch input 10*d* applied thereto and a second point 606-1 currently touched by touch & drag. Referring to FIG. 6B (a), as mentioned in the foregoing description, if the touch input 10*d* is released, the controller 180 can output a first preview image 602-1 of a first destination item by a scroll movement.

As mentioned in the foregoing description with reference to FIG. 4, when a scroll distance is determined based on a touch drag distance, if the touch drag distance is changed, a destination item will be changed by a scroll movement as well. Hence, referring to FIG. 6B (b), while the touch input 10*d* is held, if a currently touched point is changed to a third point 606-2 by being dragged, the controller 180 determines a changed destination again and can then output a second preview image 602-2 of a re-determined second destination item by switching a previously output preview image to the second preview image 602-2.

Likewise, referring to FIG. 6B (c), while the touch input 10*d* is held, if a currently touched point is changed to a fourth point 606-3 by being dragged, the controller 180 can output a third preview image 602-3 of a third destination item by switching a previously output preview image to the third preview image 602-3.

According to one embodiment of the present invention, when a control command for scrolling a content list is input, an index for passing through is set at a prescribed item. When a scroll movement is performed, the controller 180 pauses the scroll movement at the index-set prescribed passing-through item. Such an embodiment is described in detail with reference to FIG. 7 and FIG. 8 as follows.

FIG. 7 is a diagram illustrating a control method of designating an index item of a scroll movement according to one embodiment of the present invention. Referring to FIG. 7, a user can desire to check a plurality of items on a scroll movement. Hence, according to one embodiment of the present invention, the controller 180 sets an index for designating a passing-through item before arriving at a final destination item of a scroll movement. For instance, if an index is set at a first item and a second item is set as a destination, a scroll movement can be performed by being paused at the first item and then moving to the second item.

Referring to FIG. 7 (*a*), a music content play item 601 is currently output through the touchscreen 151. If a user's scroll control command 10*e* is input, a first preview image 602-1 is currently output. Thereafter, if an index setting command (e.g., an input of applying a touch 10*f* to the first preview image 602-1) is received, the controller 180 can perform an index setting on a first destination item corresponding to the first preview image 602-1. In particular, the controller 180 can save an index information on the first destination item. In this instance, the corresponding index information may include an identification information of the first destination item.

Moreover, according to one embodiment of the present invention, when the index information on the first destination item is saved, the controller 180 can output an indication bar 602 configured to indicate a relative location of the first destination item in a whole scroll region. If an index is set at the first destination item, referring to FIG. 7 (*b*), the controller 180 can display a first index 701*a*, which indicates the relative location of the first destination item, on the indication bar 602.

After the index information on the first destination item has been saved like FIG. 7 (*b*), if a touch drag distance is changed, as mentioned in the foregoing description with reference to FIGS. 6B (a) to 6B (c), the controller 180 can output a second preview image 602-2 as shown in FIG. 7 (*c*) for a second destination item corresponding to the changed distance.

Referring to FIG. 7 (*d*), if an index is set at the second destination item in response to an additional index setting command (e.g., an input of touching the second preview image 602-2), the controller 180 can display a second index 701*b*, which indicates a relative location of the second destination item, on the indication bar 602 likewise.

Figure 8A:
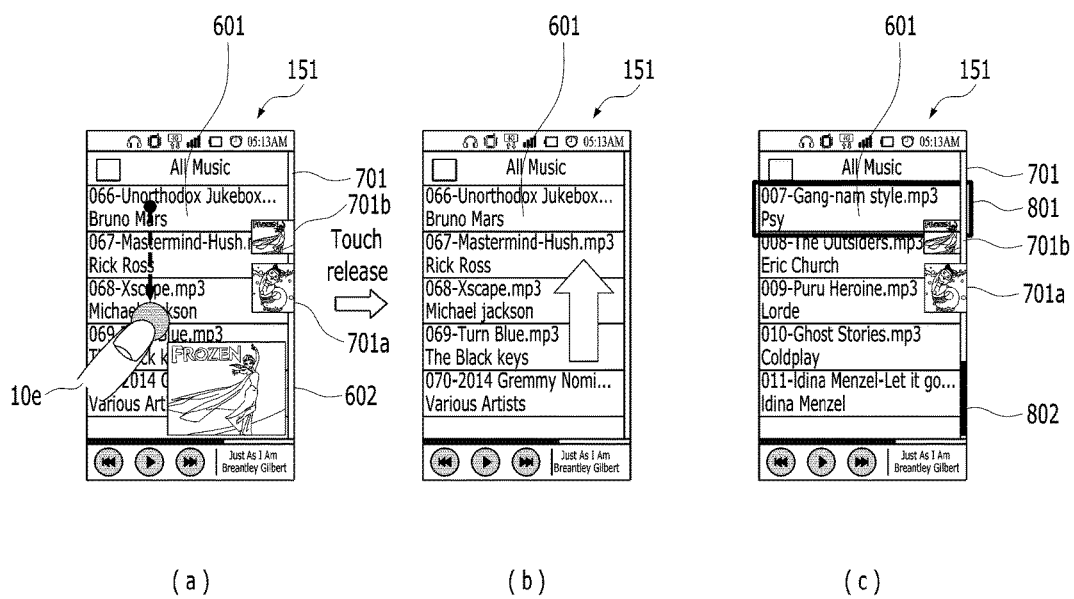
FIG. 8A is a diagram illustrating a control method of pausing a scroll at an index set item on a scroll movement according to one embodiment of the present invention.

FIG. 8A is a diagram illustrating a control method of pausing a scroll at an index set item on a scroll movement according to one embodiment of the present invention. Referring to FIG. 8A (a), while the indexes are set at the first destination item and the second destination item like FIG. 7, respectively, a touch of a touch input 10e is released. Thus, as the touch is released, referring to FIG. 8A (b), the controller 180 can perform a scroll movement.

In performing the scroll movement, referring to FIG. 8A (c), the controller 180 pauses the scroll at a first destination item 801. Thereafter, if a resume command is received, the controller 180 can resume the scroll to arrive at the first destination item 801. When the scroll movement to the first destination item 801 is performed, the controller 180 can additionally display an indication 802 of a scroll movement extent on an indication bar 602.

Meanwhile, although the aforementioned index information is the information saved to pause a scroll action, the controller 180 can utilize the saved index information when reading a list again in the future. In particular, after an application has ended, if the application is launched again, the controller 180 maintains the index information. Such an embodiment is described in detail with reference to FIG. 8B as follows.

Figure 8B:
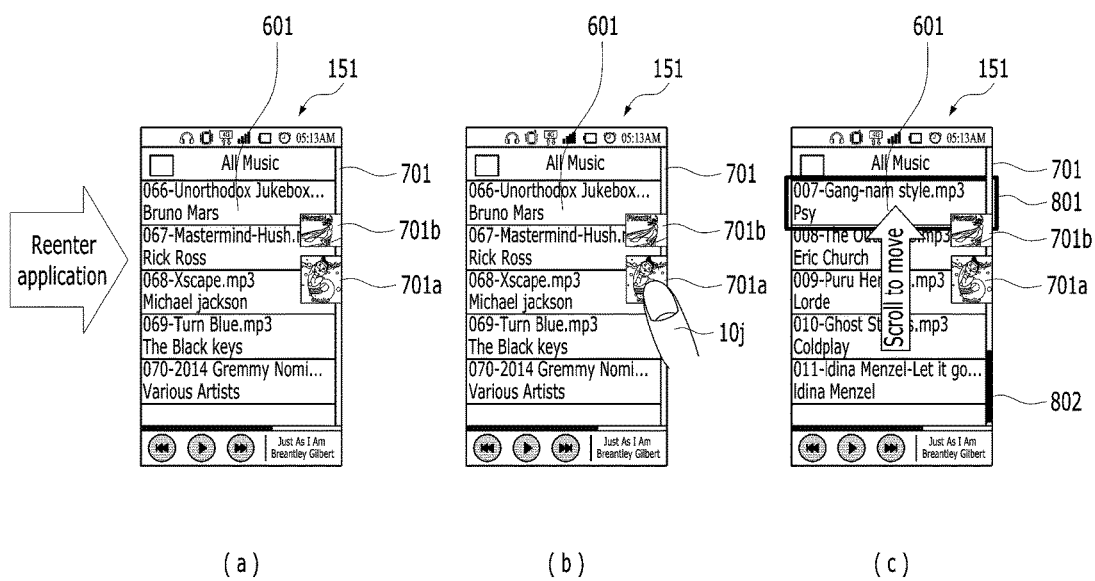
FIG. 8B is a diagram illustrating a control method of facilitating a scroll movement to a prescribed item using an index information despite re-launching a prescribed application after ending the prescribed application according to one embodiment of the present invention.

FIG. 8B is a diagram illustrating a control method of facilitating a scroll movement to a prescribed item using an index information despite re-launching a prescribed application after ending the prescribed application according to one embodiment of the present invention.

Referring to FIG. 8B (a), the first index 701a and the second index 701b set in FIG. 8A are currently displayed on the indication bar 602. After the indexes have been set in FIG. 8A, a corresponding application is launched again. If an input of selecting one of the first index 701a and the second index 702b is received, the controller 180 can scroll to move to an item indicated by the selected index (FIG. 8B (c)). In particular, if an input 10j of touching the first index 701a is received (FIG. 8B (b)), the controller 180 can scroll to move to a first destination item 801 corresponding to the index information set at the first index 701a.

In particular, according to the embodiment described in detail with reference to FIG. 8B, without the touch drag action mentioned in the description with reference to FIG. 8A, it is advantageous in that a scroll action can be easily performed using the previously saved index information. Likewise, if a scroll movement to the first destination item 801 is performed, the controller 180 can additionally display an indication 802, which indicates a scroll-moved extent, on the indication bar 602.

Meanwhile, according to a general method of displaying a content on an application, after a prescribed number of content items have been loaded, if a user makes a request for loading an additional content, a corresponding item is additionally loaded and then displayed. In case of the mobile terminal 100, since the user is billed for a data use amount in general, if a content undesired by the user is preloaded, a large charge may be made. According to this display method, a full content screen before the additional content loading can differ from that after the additional content loading in size. According to one embodiment of the present invention, if an additional loading is performed, the controller 180 performs a scroll movement action with reference to a full content screen after the loading. Examples are described in detail with reference to FIG. 9 and FIG. 10 as follows.

Figure 9:
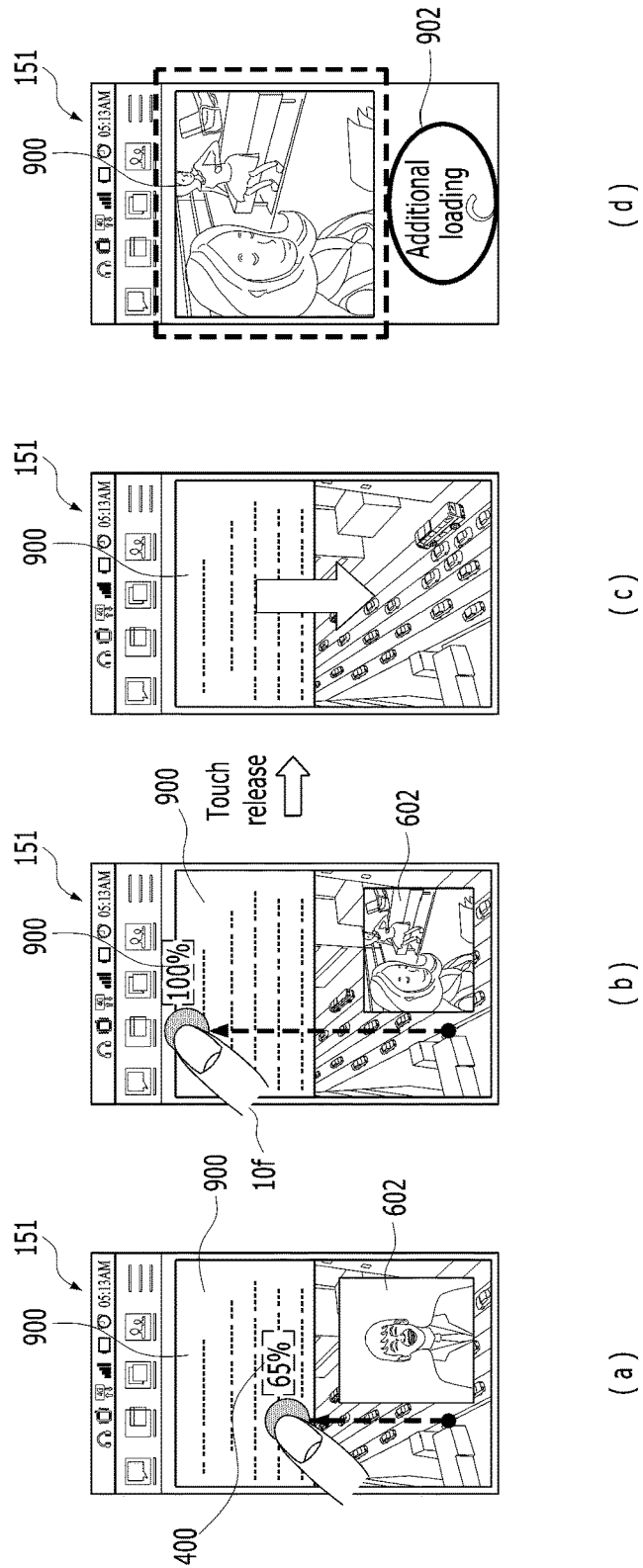
FIG. 9 is a diagram of state configuration for a control method of displaying a preview image on an SNS application according to one embodiment of the present invention.

FIG. 9 is a diagram of state configuration for a control method of displaying a preview image on an SNS application according to one embodiment of the present invention. Referring to FIG. 9, according to the embodiment for the preview image, in response to a scroll command performed on a music content play list, an album image of a destination item is displayed as a preview image. Regarding a preview image of a post output on an SNS application, a photo contained in the corresponding post can be output as a preview image.

Referring to FIG. 9 (a), a list 900 of post items is currently output on an SNS application. If a touch input 10f for scrolling the post list 900 is received, the controller 180 can output a first preview image 602-1 for a destination item (cf. 901 in FIG. 9 (c)). And, a distance indicator displayed in response to the touch input 10f indicates 65%.

Referring to FIG. 9 (b), since the touch input 10f is additionally dragged, if a touch drag length increases, a value of the distance indicator can increase to indicate 100%. And, an image for a corresponding destination item can be changed to a second preview image 602-2 (cf. the former description with reference to FIGS. 6B (a) to 6B (c)). Referring to FIG. 9 (c) and FIG. 9 (d), if a touch of the touch input 10f is released, the controller 180 can scroll to move to the corresponding destination item 901.

Meanwhile, according to one embodiment of the present invention, when a scroll movement to one end of a content screen is performed, the controller 180 automatically loads an additional content. When the destination item 901 shown in FIG. 9 (d) is located at one end of the content screen, the controller 180 can automatically load an additional content (902).

Figure 10:
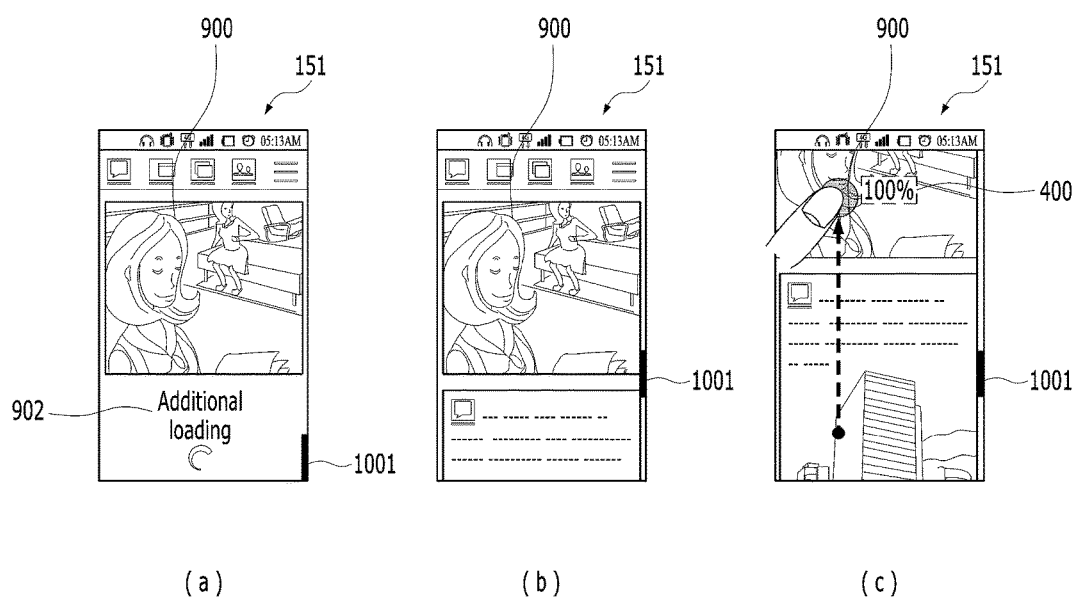
FIG. 10 is a diagram of state configuration for a control method of performing a scroll action with reference to a full content screen size in case of additionally loading a content screen according to one embodiment of the present invention.

FIG. 10 is a diagram of state configuration for a control method of performing a scroll action with reference to a full content screen size in case of additionally loading a content screen according to one embodiment of the present invention. Referring to FIG. 10 (a), an additional content is currently loaded (902) like FIG. 9 (c). Referring to a scroll bar before the additional content is loaded, a scroll indicator 1001 is located at a bottom of the scroll bar.

Once the additional content is loaded, a content item is added to a bottom end of a current content screen. Hence, a size of a full content screen increases. As the size of the full content screen increases, as shown in FIG. 10 (b), a location of the scroll indicator 1001 can be adjusted upward on the scroll bar.

According to one embodiment of the present invention, as shown in FIG. 10 (c), if a touch input 10g for a scroll movement is received, the controller 180 performs a scroll operation with reference to the full content screen increased by the additional loading. Hence, according to a distance indicator 400 indicating 100%, since each movement is made by 100% with reference to the full content screen, it can move to the last item of the content screen.

Meanwhile, when the additional loading is performed consecutively, a size of the content screen is variable or flexible. Therefore, according to one embodiment of the present invention, as mentioned in the foregoing description with reference to FIG. 10, a content screen including a currently loaded content item only is taken as a reference. If a command for a scroll movement beyond the reference is received, the controller 180 automatically loads a content. Such an embodiment is described in detail with reference to FIG. 11 as follows.

Figure 11:
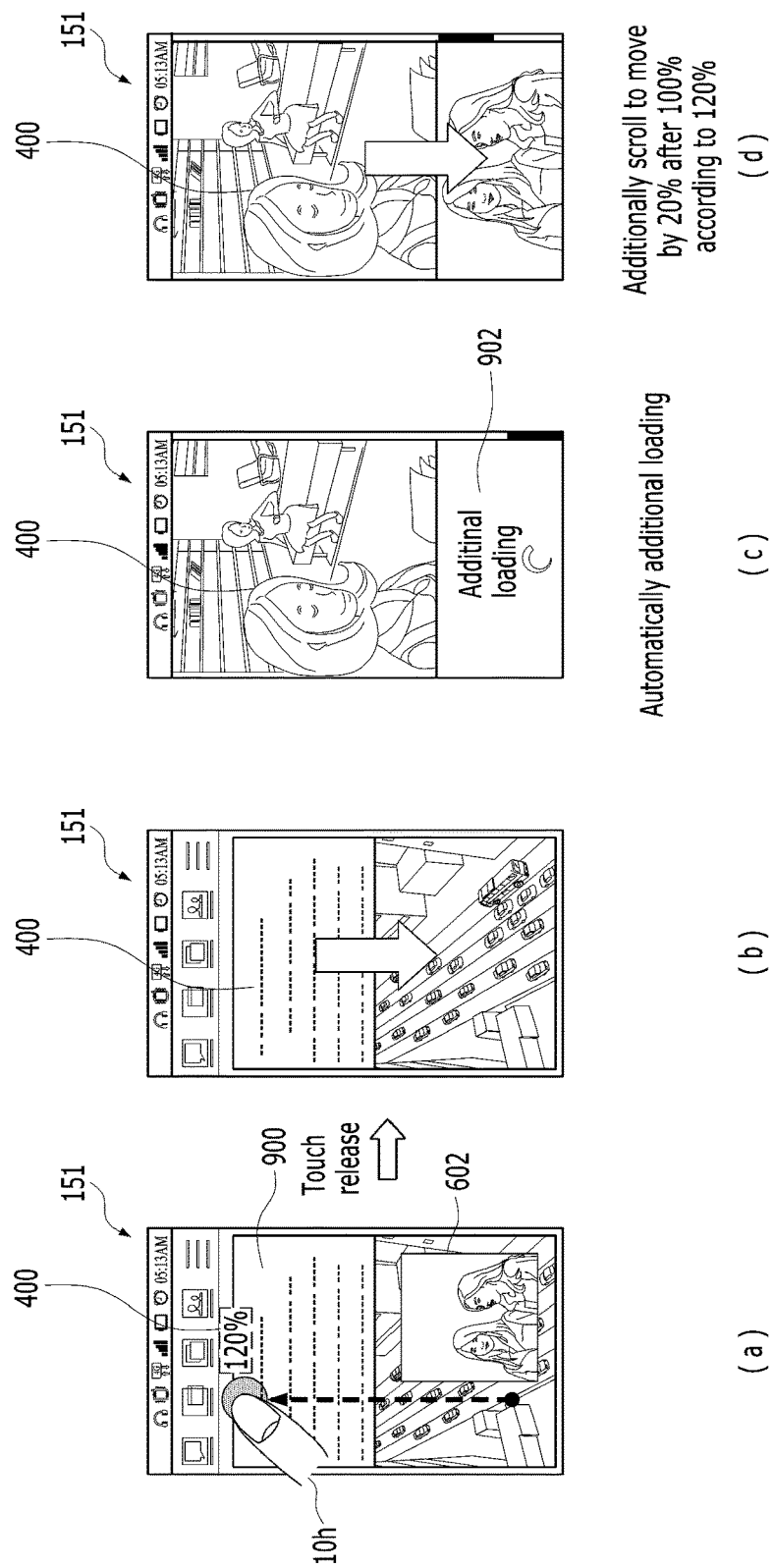
FIG. 11 is a diagram illustrating a control method of performing a remaining scroll movement after locating an additional content automatically in case of receiving a scroll movement command beyond a current content screen according to one embodiment of the present invention.

FIG. 11 is a diagram illustrating a control method of performing a remaining scroll movement after locating an additional content automatically when receiving a scroll movement command beyond a current content screen according to one embodiment of the present invention.

Referring to FIG. 11 (a), a post list 900 on a prescribe SNS application is currently output. And, a touch input 10h for scrolling to move the post list 900 is received. A preview image 602 of a destination item according to the corresponding touch input 10h can be output to a prescribed region. According to a distance indicator 400 shown in the drawing, a scroll movement can be performed by 120% of a content screen in consideration of an addible content.

Referring to FIG. 11 (b), if a touch of the touch input 10h is released, the controller 180 can scroll to move to the end of the post list 900. Subsequently, as shown in FIG. 11 (c), an additional content can be automatically loaded on a bottom of the post list 900 (902). Once the additional content is loaded (902), referring to FIG. 11 (d), the controller 180 can perform the rest of scroll (e.g., additional 20% scroll in the drawing). Meanwhile, the aforementioned control method of setting the index is applicable to an SNS application as well. A state configuration of the control method on the SNS application is described in detail with reference to FIG. 12 and FIG. 13 as follows.

Figure 12:
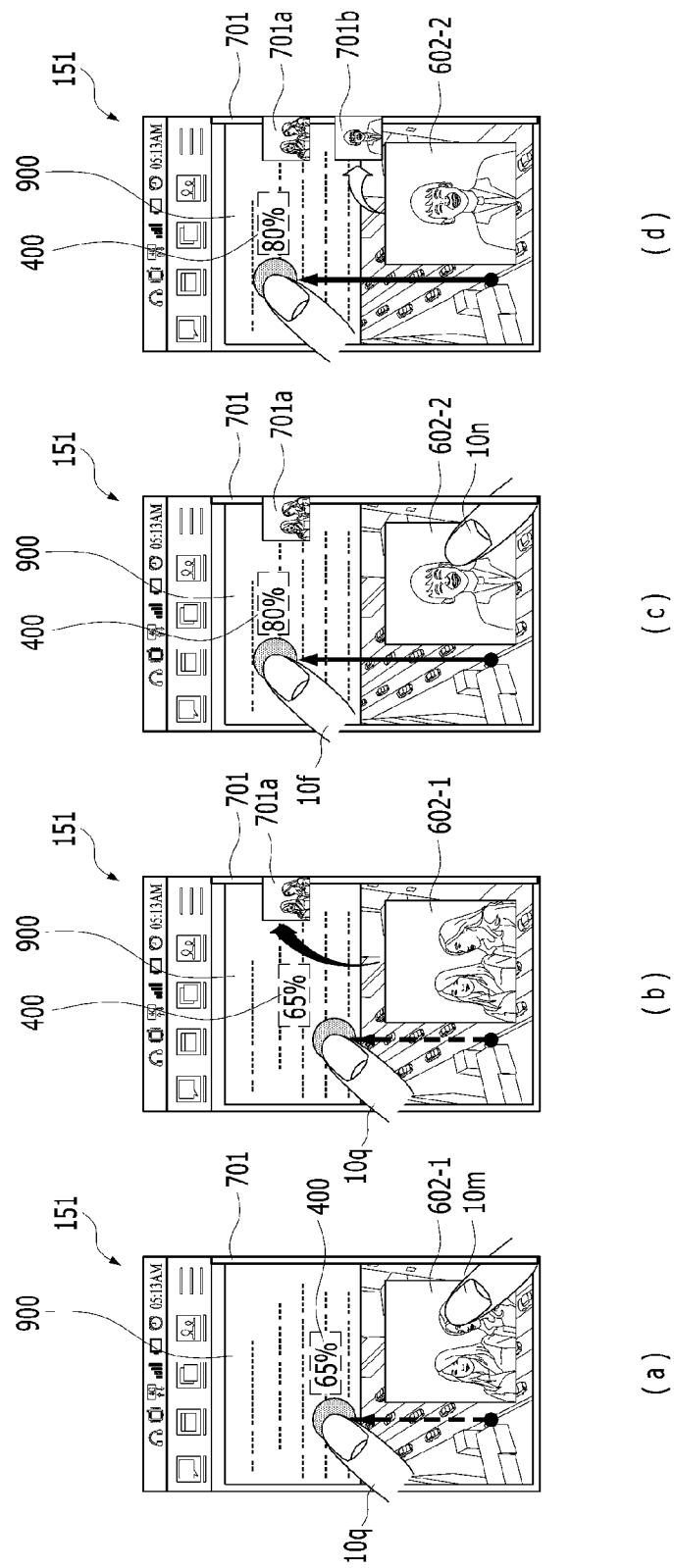
FIG. 12 is a diagram of state configuration for a method of controlling an index setup on an SNS application according to one embodiment of the present invention.

FIG. 12 is a diagram of state configuration for a method of controlling an index setup on an SNS application according to one embodiment of the present invention. Referring to FIG. 12 (a), a list 900 of post items on an SNS application is currently output through the touchscreen 151. As a user's scroll control command 10f is input, a first preview image 602-1 is currently output. Thereafter, an index setup command (e.g., an input of applying a touch 10q to the first preview image 602-1) is received, the controller 180 can perform an index setup on a first destination item corresponding to the first preview image 602-1. In particular, the controller 180 can save an index information on the first destination item.

If the index is set at the first destination item, referring to FIG. 12 (c), the controller 180 can display a first index 701a, which indicates a relative location of the first destination item, on an indication bar 602. After the index information on the first destination item has been saved like FIG. 12 (b), if a touch drag distance is changed, as mentioned in the foregoing description with reference to FIGS. 6B (a) to 6B (c), the controller 180 can output a second preview image 602-2 for a second destination item corresponding to the changed distance.

In response to an additional index setup command (e.g., an input 10n of touching the second preview image 602-2), referring to FIG. 12 (d), if an index is set at the second destination item, the controller 180 can display a second index 701b, which indicates a relative location of the second destination item, on the indication bar 602.

According to one embodiment of the present invention, after an SNS application has been stopped, although the stopped SNS application is launched again, the controller 180 maintains the index information. Such an embodiment is described in detail with reference to FIG. 13 as follows. FIG. 13 is a diagram illustrating a control method of facilitating a scroll movement to a prescribed item using a pre-saved index information despite relaunching an SNS application after stopping the SNS application according to one embodiment of the present invention.

Referring to FIG. 13 (a), a first index 701a and a second index 701b set in FIG. 12 are currently displayed on the indication bar 602. After the indexes have been set in FIG. 12, an application is launched again. If an input of selecting one of the first index 701a and the second index 701b is received, the controller 180 can scroll to move to an item indicated by the corresponding index (FIG. 13 (c)).

In particular, if an input 10p of touching the first index 701a is received (FIG. 13 (b), the controller 180 can scroll to move to a first destination item 801 corresponding to the index information saved in the first index 701a (FIG. 13 (c)). Likewise, if the controller 180 scrolls to move to the first destination item 801, the controller 180 can additionally display a scroll movement extent on the indication bar 602 (802).

Accordingly, embodiments of the present invention provide various effects and/or features. According to at least one of embodiments of the present invention, a considerable amount of scroll command can be easily given. According to at least one of embodiments of the present invention, when a scroll movement is performed, a destination item can be checked in advance.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses.

This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
    a wireless communication unit configured to provide wireless communication;
    a touchscreen configured to display a content screen including a content list of a plurality of content items; and
    a controller configured to:
    display a part of the content screen on the touchscreen,
    receive a touch input to a first point on the touchscreen, wherein the touch input is held over a prescribed time on the first point, and then released to a second point,
    scroll the part of the content screen by a prescribed scroll distance corresponding to a distance between the first point and the second point, wherein the prescribed scroll distance is based on a time taken to hold the touch input on the first point,
    display a distance indicator for guiding the prescribed scroll distance, display a preview image for a destination content item of the content screen at a scrolled point reached by the scroll on the content screen while the touch input is held, save index information of the destination content item in response to the preview image being touched with a second touch input while the first touch input is held, display an indication bar on the touchscreen configured to indicate a relative location of the destination content item by displaying an index which indicates the relative location of the destination content item on the indication bar, and scroll to move to the destination content item corresponding to the saved index information in response to the index being touched with a third touch input.

2. The mobile terminal of claim 1, wherein the scroll distance is in proportion to the distance between the first point and the second point.

3. The mobile terminal of claim 2, wherein the controller is further configured to scroll the content screen by the prescribed scroll distance at a rate of the distance between the first point and the second point over a total length of the content screen.

4. The mobile terminal of claim 3, wherein the controller is further configured to display the rate on the touchscreen.

5. The mobile terminal of claim 1, wherein the controller is further configured to scroll the content screen in a direction from the second point toward the first point.

6. A method of controlling a mobile terminal, the method comprising:

displaying a part of a content screen including a content list of a plurality of content items on a touchscreen;

receiving, via a controller, a touch input to a first point on the touchscreen, wherein the touch input is held over a prescribed time on the first point, and then released to a second point;

scrolling the part of the content screen by a prescribed scroll distance corresponding to a distance between the first point and the second point, wherein the prescribed scroll distance is based on a time taken to hold the touch input on the first point;

displaying a distance indicator for guiding the prescribed scroll distance;

displaying a preview image for a destination content item of the content screen at a scrolled point reached by the scroll on the content screen while the touch input is held;

saving index information of the destination content item in response to the preview image being touched with a second touch input while the first touch input is held;

displaying an indication bar on the touchscreen configured to indicate a relative location of the destination content item by displaying an index which indicates the relative location of the destination content item on the indication bar; and scrolling to move to the destination content item corresponding to the saved index information in response to the index being touched with a third touch input.

7. The method of claim 6, wherein the scroll distance is in proportion to the distance between the first point and the second point.

8. The method of claim 7, further comprising:

scrolling the content screen by the prescribed scroll distance at a rate of the distance between the first point and the second point over a total length of the content screen.

9. The method of claim 8, further comprising:

displaying the rate on the touchscreen.

10. The method of claim 6, further comprising:

scrolling the content screen in a direction from the second point toward the first point.

* * * * *